(12) United States Patent  
Mizuno et al.

(10) Patent No.: US 9,423,609 B2  
(45) Date of Patent: Aug. 23, 2016

(54) ACTUATOR, LIGHT SCANNER, IMAGE DISPLAY DEVICE, AND HEAD MOUNT DISPLAY

(71) Applicant: Seiko Epson Corporation, Tokyo (JP)

(72) Inventors: Emi Mizuno, Matsumoto (JP); Yasushi Mizoguchi, Suwa (JP)

(73) Assignee: Seiko Epspon Corporation (JP)

( * ) Notice: Subject to any disclaimer, the term of this patent is extended or adjusted under 35 U.S.C. 154(b) by 59 days.

(21) Appl. No.: 14/026,365

(22) Filed: Sep. 13, 2013

(65) Prior Publication Data

US 2014/0071510 A1   Mar. 13, 2014

(30) Foreign Application Priority Data

Sep. 13, 2012 (JP) .................................. 2012-201300

(51) Int. Cl.  
*G02B 26/10* (2006.01)  
*G02B 27/01* (2006.01)

(52) U.S. Cl.  
CPC .............. *G02B 26/10* (2013.01); *G02B 26/101* (2013.01); *G02B 26/105* (2013.01); *G02B 27/0149* (2013.01); *G02B 27/0172* (2013.01)

(58) Field of Classification Search  
CPC ... G02B 26/08; G02B 26/0816; G02B 26/085  
USPC .......... 359/212.1, 223.1, 196.1, 198.1, 199.1, 359/199.3; 335/220, 222  
See application file for complete search history.

(56) References Cited

U.S. PATENT DOCUMENTS

| 5,912,608 | A | * | 6/1999 | Asada | ............................ 335/222 |
| 6,046,834 | A | * | 4/2000 | Asada | ....................... G01V 8/10 250/234 |
| 6,108,118 | A | * | 8/2000 | Minamoto | ........... G02B 26/085 310/36 |
| 6,188,504 | B1 | * | 2/2001 | Murakami | ........... G02B 7/1821 359/224.1 |
| 7,148,591 | B2 | * | 12/2006 | Mizoguchi | ......... G02B 26/0841 310/36 |
| 7,324,252 | B2 | * | 1/2008 | Yee | ....................... G02B 26/085 359/198.1 |
| 7,876,484 | B2 | * | 1/2011 | Mizoguchi | ........... G02B 26/085 359/202.1 |
| 2004/0120022 | A1 | * | 6/2004 | Cannon | ............... G02B 26/0833 359/199.3 |
| 2008/0078262 | A1 | * | 4/2008 | Murata et al. | ................... 74/126 |
| 2010/0238533 | A1 | | 9/2010 | Nakamura et al. | |
| 2012/0033280 | A1 | * | 2/2012 | Mizoguchi | ........... G02B 26/085 359/199.3 |

FOREIGN PATENT DOCUMENTS

| JP | 08-322227 A | 12/1996 |
| JP | 2004-264684 A | 9/2004 |
| JP | 2010-217648 A | 9/2010 |

\* cited by examiner

*Primary Examiner* — Bumsuk Won  
*Assistant Examiner* — William R Alexander  
(74) *Attorney, Agent, or Firm* — Harness, Dickey & Pierce, P.L.C.

(57) ABSTRACT

An actuator includes: a movable plate; a first axial member adapted to swingably support the movable plate around a first axis; a reflecting section fixed to the movable plate, and having a reflecting surface adapted to reflect light; and a coil disposed on an opposite surface of the reflecting section to the reflecting surface.

10 Claims, 11 Drawing Sheets

ACTUATOR, LIGHT SCANNER, IMAGE DISPLAY DEVICE, AND HEAD MOUNT DISPLAY

BACKGROUND

1. Technical Field

The present invention relates to an actuator, a light scanner, an image display device, and a head mount display.

2. Related Art

In the past there has been known an optical device having an axial member, which includes a plate-like attachment section and an elastic support section for swingably supporting the attachment section around a predetermined axis, and a light reflecting member, which is disposed on a surface of the attachment section. In such an optical device, by, for example, disposing a coil on an opposite surface of the attachment section to the surface on which the light reflecting member is disposed, and further disposing a permanent magnet as a ferromagnetic body, it becomes possible to swing the light reflecting section provided to the attachment section around the predetermined axis due to the interaction between the coil and the permanent magnet (see, e.g., JP-A-2010-217648).

However, in the optical device described above, as the area of the attachment section decreases due to the miniaturization of the overall structure, the number of turns of the coil (the formation area of the coil) decreases. Therefore, there is a problem that the magnetic force is weakened, and thus the swing (drive) efficiency of the light reflecting member disposed on the surface of the attachment section is degraded.

SUMMARY

An advantage of some aspects of the invention is to solve at least a part of the problems described above, and the invention can be implemented as the following forms or application examples.

Application Example 1

This application example is directed to an actuator including a movable plate, a first axial member adapted to swingably support the movable plate around a first axis, a reflecting section fixed to the movable plate, and having a reflecting surface adapted to reflect light, and a coil disposed on an opposite surface of the reflecting section to the reflecting surface.

According to this configuration, even in the case of miniaturizing the overall structure including the movable plate, since the reflecting section and the movable plate are separated from each other, the size of the reflecting section can be maintained without being affected by the size of the movable plate, and at the same time, the number of turns (the formation area) of the coil can be prevented from decreasing. Thus, it is possible to increase the magnetic force to thereby improve the swing efficiency of the reflecting section.

Application Example 2

This application example is directed to the actuator according to the application example described above, wherein an area of the reflecting section is larger than an area of the movable plate in a plan view from a thickness direction of the movable plate.

According to this configuration, the formation area of the coil can be increased.

Application Example 3

This application example is directed to the actuator according to the application example described above, wherein the actuator further includes a conduction connection section provided to the movable plate, and a contact section disposed on the conduction connection section, and adapted to electrically connect the coil and the conduction connection section to each other.

According to this configuration, the coil provided to the reflecting section and the conduction connection section provided to the movable plate are electrically connected to each other. Thus, it becomes possible to easily supply the coil with a voltage from the conduction connection section side. Further, since the contact section is disposed on the conduction connection section of the movable plate, the contact section has a function of a spacer (pillar) between the movable plate and the reflecting section. Therefore, it is possible to prevent the reflecting section from having contact with another member when the reflecting section performs the swinging motion.

Application Example 4

This application example is directed to the actuator according to the application example described above, wherein the actuator further includes a first detection section provided to the first axial member and adapted to detect a stress generated in the first axial member.

According to this configuration, it is possible to detect the stress generated in the first axial member by the first detection section to thereby detect the swinging angle of the movable plate around the first axis.

Application Example 5

This application example is directed to the actuator according to the application example described above, wherein the actuator further includes a movable frame disposed on a periphery of the movable plate, and to which the first axial member is connected, and a second axial member connected to the movable frame, and adapted to swingably support the movable frame around a second axis intersecting with the first axis.

According to this configuration, the reflecting section fixed to the movable plate becomes swingable around the first axis and the second axis. Further, it is possible to surely dispose the coil on the surface of the reflecting section without being restricted by the size of the movable frame and so on.

Application Example 6

This application example is directed to the actuator according to the application example described above, wherein the actuator further includes a coil provided to the movable frame.

According to this configuration, since the coil is further provided also to the movable frame in addition to the coil provided to the reflecting section, it is possible to further increase the magnetic force to thereby improve the swing (drive) efficiency of the reflecting section.

Application Example 7

This application example is directed to the actuator according to the application example described above, wherein the reflecting section is disposed so as to cover the movable frame in the plan view.

According to this configuration, in the case of, for example, emitting the light toward the reflecting section from the outside, there is no chance for the light to reach the movable plate, the first axial member, or the movable frame. Therefore, the stray light reflected by these components can be prevented from occurring.

Application Example 8

This application example is directed to the actuator according to the application example described above, wherein the actuator further includes a second detection section provided to the second axial member and adapted to detect a stress generated in the second axial member.

According to this configuration, it becomes possible to detect the stress generated in the second axial member using the second detection section.

Application Example 9

This application example is directed to a light scanner including a movable plate, a first axial member adapted to swingably support the movable plate around a first axis, a reflecting section fixed to the movable plate, and having a reflecting surface adapted to reflect light, and a coil disposed on an opposite surface of the reflecting section to the reflecting surface.

According to this configuration, even in the case of miniaturizing the overall structure including the movable plate, since the reflecting section and the movable plate are separated from each other, the size of the reflecting section can be maintained without being affected by the size of the movable plate, and at the same time, the number of turns (the formation area) of the coil can be prevented from decreasing. Thus, it is possible to increase the magnetic force to thereby improve the swing efficiency of the reflecting section.

Application Example 10

This application example is directed to an image display device including an actuator including a movable plate, a first axial member adapted to swingably support the movable plate around a first axis, a reflecting section fixed to the movable plate, and having a reflecting surface adapted to reflect light, and a coil disposed on an opposite surface of the reflecting section to the reflecting surface, and an irradiation section adapted to irradiate the actuator with the light.

According to this configuration, the image display device equipped with the actuator having the reflecting section driven efficiently can be provided.

Application Example 11

This application example is directed to a head mount display including an actuator including a movable plate, a first axial member adapted to swingably support the movable plate around a first axis, a reflecting section fixed to the movable plate, and having a reflecting surface adapted to reflect light, and a coil disposed on an opposite surface of the reflecting section to the reflecting surface, and an irradiation section adapted to irradiate the actuator with the light.

According to this configuration, the head mount display (HMD) equipped with the actuator having the reflecting section driven efficiently can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be explained with reference to the accompanying drawings. It should be noted that in each of the following drawings, the scale sizes of the members and so on are made different from the actual dimensions in order to express the members and so on to have recognizable dimensions.

First Embodiment

Configuration of Actuator (Light Scanner)

Figure 1A:
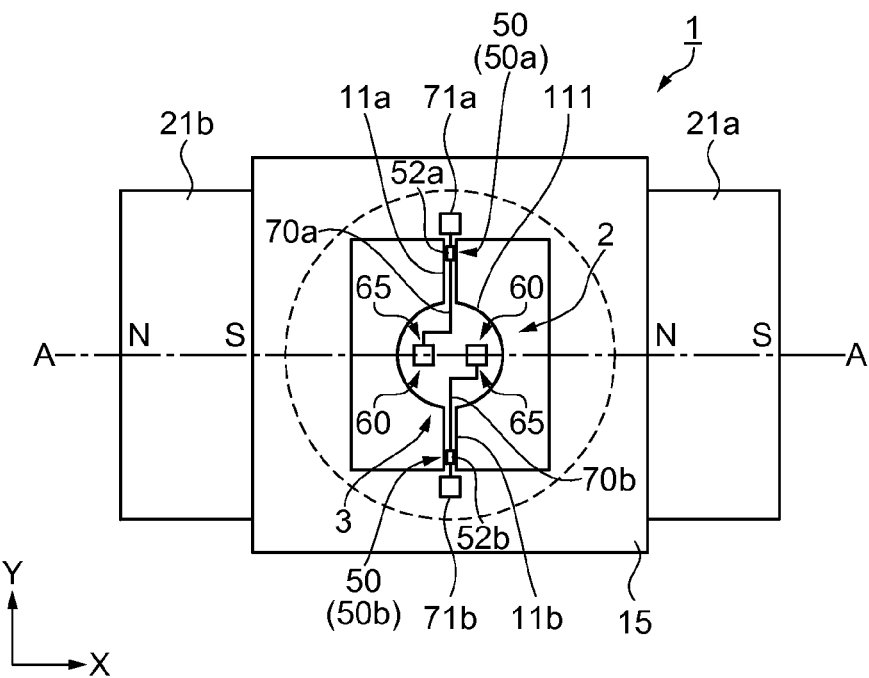
FIGS. 1A through 1C are schematic diagrams showing a configuration of a light scanner according to a first embodiment of the invention.
Figure 1B:
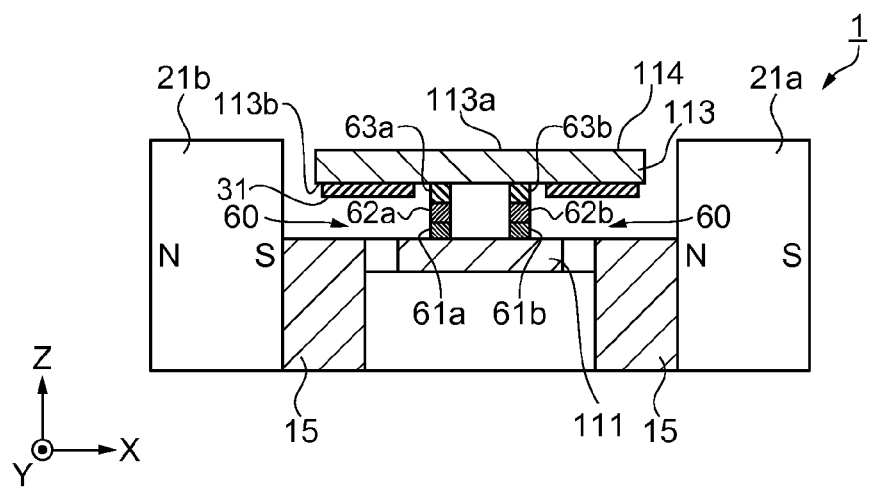
Figure 1C:
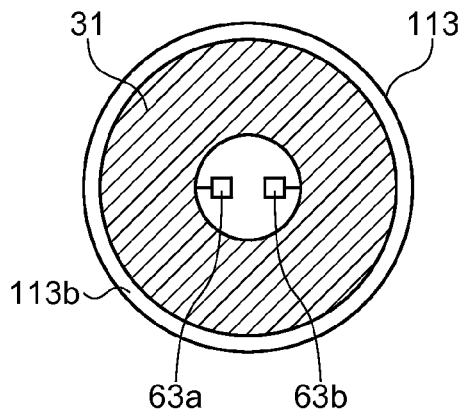
Figure 2:
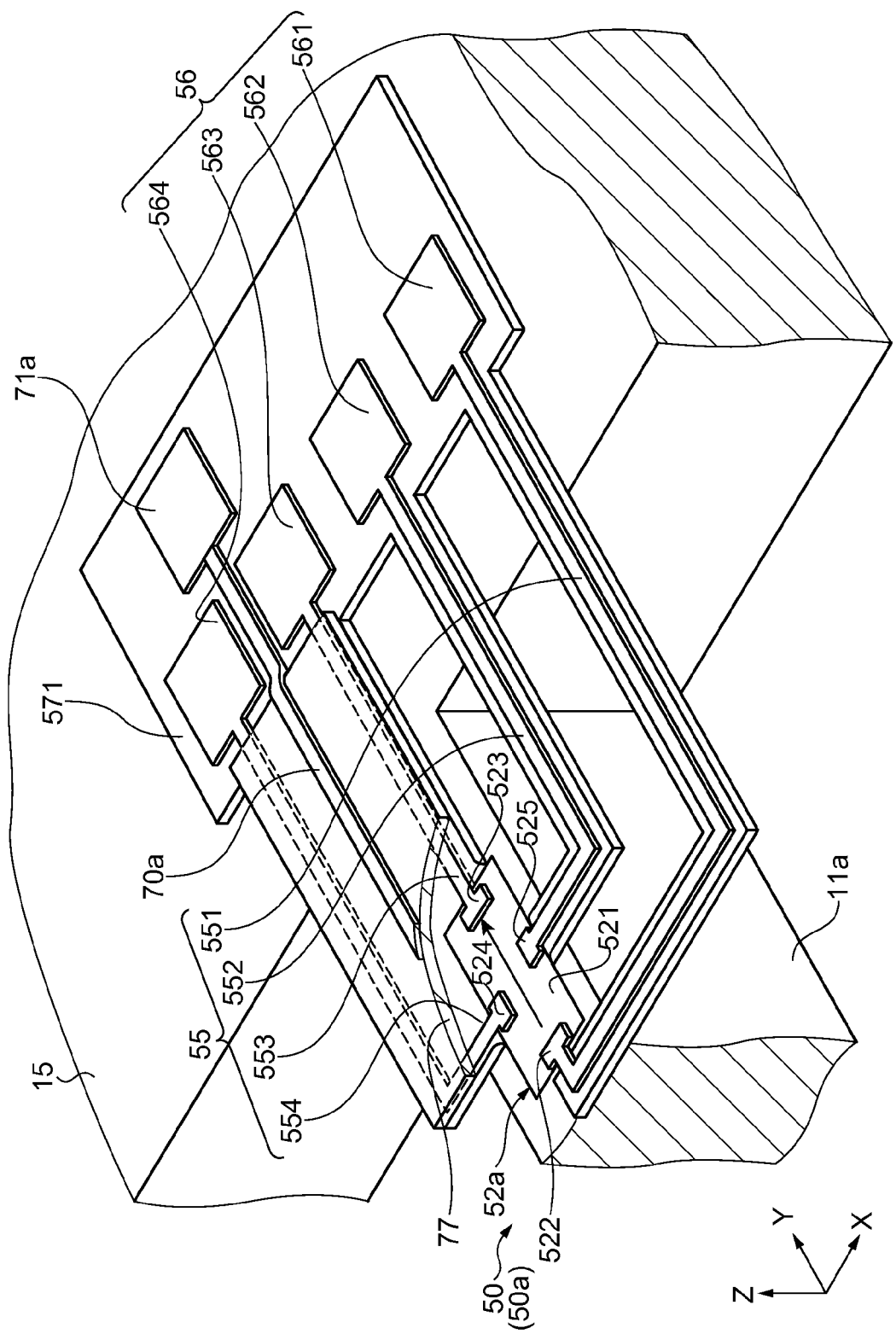
FIG. 2 is a partial enlarged view of the light scanner according to the first embodiment.

Firstly, a configuration of an actuator will be explained. It should be noted that in the present embodiment, the explanation will be presented citing a light scanner, as an actuator, as an example. FIGS. 1A through 1C show the configuration of a light scanner according to the present embodiment, wherein FIG. 1A is a plan view, FIG. 1B is a cross-sectional view along the A-A line in FIG. 1A, and FIG. 1C is a plan view of a reflecting section. Further, FIG. 2 is a partial enlarged view of the light scanner according to the present embodiment. As shown in FIGS. 1A through 1C, the light scanner 1 is provided with a movable plate 111, a first axial member 3 for swingably supporting the movable plate 111 around a first axis, a reflecting section 113 fixed to the movable plate 111 and having a reflecting surface 114 for reflecting light, and a coil 31 disposed on an opposite surface of the reflecting section 113 to the reflecting surface 114. Further, there are provided a pair of permanent magnets 21a, 21b disposed across an outer frame support section 15. Further, there is provided a voltage applying section (not shown) for applying a predetermined voltage to the coil 31.

The first axial member 3 includes a pair of axial members 11a, 11b. Further, the outer frame support section 15 is disposed so as to surround the periphery of the movable plate 111, and the movable plate 111 is connected to the outer frame support section 15 via the axial members 11a, 11b. The axial members 11a, 11b can elastically be deformed. Further, the axial members 11a, 11b connect the movable plate 111 and the outer frame support section 15 to each other so that the movable plate 111 can rotate (swing) around a Y axis.

The axial members 11a, 11b are disposed so as to be opposed to each other via the movable plate 111. Further, the axial members 11a, 11b each have an elongated shape extending in a direction along the Y axis. Further, the axial members 11a, 11b each have one end portion connected to the movable plate 111, and the other end portion connected to the outer frame support section 15. Further, the axial members 11a, 11b are each disposed so that the center axis and the Y axis coincide with each other. The axial members 11a, 11b configured in such a manner as described above are each torsionally deformed due to the swing of the movable plate 111 around the Y axis. It should be noted that the configuration of the axial members 11a, 11b is not limited to the configuration described above. For example, a meander shape having flexion or curvature at least one place in the middle can also be provided. Further, the number of the axial members 11a, 11b can be singular or plural. The movable plate 111, the axial members 11a, 11b, and the outer frame support section 15 are formed integrally using, for example, a silicon single crystal substrate.

The reflecting section 113 has a plate-like shape, and at the same time, has a circular shape in a plan view. It should be noted that the plan view denotes a view from a thickness direction of the movable plate, and will be used hereinafter in the same meaning unless particularly explained. Further, on a first surface 113a of the reflecting section 113, there is formed the reflecting surface 114 for reflecting light. Further, as shown in FIGS. 1B and 1C, on a second surface 113b of the reflecting section 113 opposite to the first surface 113a, there is formed the coil 31. It should be noted that the shape of the reflecting section 113 in the plan view is not limited to a circular shape, but can also be, for example, an elliptical shape or a polygonal shape such as a quadrangular shape.

Further, as shown in FIGS. 1A through 1C, the reflecting section 113 is formed so as to cover the movable plate 111 in the plan view. In other words, the area of the reflecting section 113 is larger than the area of the movable plate 111 in the plan view. In the present embodiment, the movable plate 111 and the axial members 11a, 11b are disposed inside the reflecting section 113 in the plan view. Therefore, it is possible to increase the area of the reflecting section 113 while decreasing the distance between the axial members 11a, 11b. Further, since the distance between the axial members 11a, 11b can be decreased, miniaturization of the outer frame support section 15 can be achieved. Thus, it becomes possible to miniaturize the overall structure of the light scanner 1 while keeping the area of the reflecting section 113 large. Further, it is possible to prevent unwanted light from being reflected by the movable plate 111 and the axial members 11a, 11b to become stray light. Further, it is preferable that an antireflection treatment is performed on the surface of the outer frame support section 15. Thus, it is possible to prevent the unwanted light applied to the outer frame support section 15 from becoming the stray light. Such an antireflection treatment is not particularly limited, but there can be cited, for example, formation of an antireflection film (a dielectric multilayer film), a surface roughening process, and a blackening process. It should be noted that the antireflection treatment can also be performed on the surfaces of the movable plate 111 and the axial members 11a, 11b besides the outer frame support section 15.

As shown in FIGS. 1B and 1C, on the second surface 113b of the reflecting section 113, there is formed the coil 31. The coil 31 is formed by winding a wire around the center of the reflecting section 113 so as to form a ring-like shape. Any material having electrical conductivity can be adopted as the material of the coil 31, and the metal such as copper or aluminum is preferable. Further, one end of the coil 31 is electrically connected to a first terminal 63a disposed on the second surface 113b of the reflecting section 113. Further, the other end of the coil 31 is electrically connected to a second terminal 63b disposed on the second surface 113b of the reflecting section 113.

Further, the movable plate 111 is provided with conduction connection sections 65, and there are provided contact sections 60 disposed on the movable plate 111 and electrically connecting the coil 31 formed on the reflecting section 113 and the conduction connection sections 65 to each other. Specifically, a first connection terminal 61a and a second connection terminal 61b are formed on the movable plate 111 as a part of the conduction connection sections 65, and conduction wiring lines 70a, 70b are extracted respectively from the first connection terminal 61a and the second connection terminal 61b. Further, the conduction wiring lines 70a, 70b are connected respectively to external terminals 71a, 71b formed on the outer frame support section 15. Further, the external terminals 71a, 71b are electrically connected to the voltage applying section not shown.

The contact sections 60 are for electrically connecting the first terminal 63a and the second terminal 63b extracted from the coil 31 and the first connection terminal 61a and the second connection terminal 61b formed on the movable plate 111 to each other using electrically-conductive members 62a, 62b, respectively. In the present embodiment, the first terminal 63a and the second terminal 63b are connected to the first connection terminal 61a and the second connection terminal 61b formed on the movable plate 111 using, for example, a soldering material (soldering balls or soldering paste) as the electrically-conductive members 62a, 62b, respectively. It should be noted that a soft magnetic material having electrical conductivity such as nickel or permalloy (nickel-iron alloy) is preferably used for the first terminal 63a, the second terminal 63b, the first connection terminal 61a, and the second connection terminal 61b. By adopting such a configuration as described above, the first terminal 63a, the second terminal 63b, the first connection terminal 61a, and the second connection terminal 61b can be made to function as a core material.

Further, since the contact sections 60 are provided between the movable plate 111 and the reflecting section 113, there is provided a configuration in which the reflecting section 113 is separated in the thickness direction (the Z-axis direction) from the axial members 11a, 11b. In other words, the contact sections 60 function as pillars. Therefore, since the reflecting section 113 is not directly connected to the side surfaces of the axial members 11a, 11b, it is possible to prevent or inhibit the stress due to the torsional deformation of the axial members 11a, 11b from acting on the reflecting section 113 when the reflecting section 113 swings (rotates), and as a result, the deflection of the reflecting section 113 can be reduced.

On the side surface of the outer frame support section 15, there are disposed a pair of permanent magnets 21a, 21b. Specifically, as shown in FIGS. 1A and 1B, the pair of permanent magnets 21a, 21b are opposed to each other via the Y axis (the swing center axis) of the movable plate 111 (the reflecting section 113), and at the same time, disposed across the coil 31 as shown in FIG. 1B. Further, the permanent magnets 21a, 21b are disposed so that the opposite magnetic poles are opposed to each other. In the present embodiment, the permanent magnets 21a, 21b are disposed so that the north pole of one permanent magnet 21a and the south pole of the other permanent magnet 21b are opposed to each other.

As each of the permanent magnets 21a, 21b described above, a neodymium magnet, a ferrite magnet, a samarium-cobalt magnet, an alnico magnet, a bond magnet, or the like can preferably be used.

Further, the first axial member 3 is provided with detection sections (first detection sections) 50 (50a, 50b) for detecting the behavior of the first axial member 3. Specifically, the detection sections 50 are for detecting the stress caused in the first axial member 3. The detection sections 50 (50a, 50b) of the present embodiment include piezoelectric resistor elements 52a, 52b. On the upper surface of the axial member 11a, there is disposed the piezoelectric resistor element 52a, and further, on the upper surface of the axial member 11b, there is disposed the piezoelectric resistor element 52b. More specifically, the piezoelectric resistor element 52a is disposed at an end portion of the axial member 11a on the side near to the outer frame support section 15 (far from the movable plate 111), and the piezoelectric resistor element 52b is disposed at an end portion of the axial member 11b on the side near to the outer frame support section 15 (far from the movable plate 111). Hereinafter, the detailed explanation will further be presented. It should be noted that since the configurations of the detection sections 50a, 50b respectively including the piezoelectric resistor elements 52a, 52b are substantially the same as each other, the explanation will be presented citing the detection section 50a as an example.

As shown in FIG. 2, the piezoelectric resistor element 52a in the detection section 50a is electrically connected to an electrode group 56 disposed on the outer frame support section 15 via a wiring line group 55 formed on a base member 571. The wiring line group 55 is composed of wiring lines 551, 552, 553, and 554, and the electrode group 56 is composed of electrodes 561, 562, 563, and 564.

The piezoelectric resistor element 52a includes a piezoelectric resistor region 521 disposed on the axial member 11a, a pair of input electrodes 522, 523 disposed side by side on the piezoelectric resistor region 521 and on the swing (rotation) center axis (the Y axis), and a pair of output electrodes 524, 525 disposed side by side on the piezoelectric resistor region 521 in a direction perpendicular to the swing (rotation) center axis (the Y axis). The piezoelectric resistor region 521 can be formed by doping (diffusing or ion-injecting) n-type or p-type impurities to the surface of the axial member 11a.

The input electrode 522, which is disposed at one end portion (the end portion located on the side near to the movable plate 111) out of the both end portions of the piezoelectric resistor region 521 in the rotation center axis Y direction, is connected to the electrode 561 via the wiring line 551, and the input electrode 523 disposed at the other end portion (the end portion located on the side far from the movable plate 111) is connected to the electrode 563 via the wiring line 553. Thus, it is possible to apply a voltage between the pair of input electrodes 522, 523.

Further, the output electrode 524, which is disposed at one end portion out of the both end portions of the piezoelectric resistor region 521 in the direction perpendicular to the swing center axis, is connected to the electrode 564 via the wiring line 554, and the output electrode 525 disposed on the other end portion is connected to the electrode 562 via the wiring line 552. Thus, it is possible to detect the voltage value and the resistivity value between the pair of output electrodes 524, 525. In the piezoelectric resistor element 52 configured as described above, by detecting the voltage value of the piezoelectric resistor region 521 via the pair of output electrodes 524, 525 while applying the electric field E to the piezoelectric resistor region 521 via the pair of input electrodes 522, 523, the resistivity value of the piezoelectric resistor region 521 can be detected. Specifically, by applying the voltage between the pair of input electrodes 522, 523, the electric field E is generated on the piezoelectric resistor region 521. Then, when a shear stress is generated in the piezoelectric resistor region 521 in such an electric field E, the resistivity value of the piezoelectric resistor region 521 varies in accordance with the degree of the shear stress, and then the electric potential difference corresponding to the variation occurs between the pair of output electrodes 524, 525. The electric potential difference corresponds to the amount of the torsional deformation of the axial member 11a and the rotational angle (swing angle) of the movable plate 111. Therefore, it is possible to detect the behavior of the movable plate 111 based on the electric potential difference.

Further, as shown in FIG. 2, an insulating film 77 is formed on a part of the wiring lines 551 through 554 of the wiring line group 55, a conduction wiring line 70a is formed on the insulating film 77, and the conduction wiring line 70a is connected to the external terminal 71a. It should be noted that the configuration of the detection section 50b, the configuration of a conduction wiring line 70b and the external terminal 71b are the same as the configurations described above, and therefore, the explanation thereof will be omitted.

Then, an operation of the light scanner 1 will be explained. Firstly, a power supply circuit not shown applies an alternating voltage to the coil 31 via the external terminals 71a, 71b, the conduction wiring lines 70a, 70b, and the contact sections 60. Thus, the direction of the magnetic field generated in the coil 31 is switched between an upward direction and a downward direction. Therefore, the reflecting section 113 disposed in the magnetic field of the pair of permanent magnets 21a, 21b swings (rotates) around the Y axis in conjunction with the torsional deformation of the axial members 11a, 11b.

Further, the first terminal 63a, the second terminal 63b, the first connection terminal 61a, and the second connection terminal 61b constituting a part of the contact sections 60 are each made of a soft magnetic material, and therefore function as the core material. Specifically, the magnetic field generated in the permanent magnet 21a traverses the coil 31 and proceeds toward the permanent magnet 21b on the one hand, there can be the case in which the magnetic field generated in the permanent magnet 21a fails to traverse the coil 31 and proceeds toward the permanent magnet 21b via the outside (the periphery) of the coil 31 on the other hand. In this case, the magnetic field (reactive magnetic field) passing through the outside of the coil 31 fails to make a contribution to the interaction with the current flowing through the coil 31, and is therefore one of the factors of the degradation of the swing efficiency of the movable plate 111 and so on. Therefore, in the present embodiment, the contact sections 60 having a function of the core material are disposed in the central portion of the coil 31 formed to have a ring-like shape in the plan view. Therefore, since the magnetic field generated in the permanent magnet 21a proceeds toward the permanent magnet 21b while proceeding toward the core material (the contact sections 60), it is possible to concentrate the magnetic field so as to traverse the coil 31. Thus, the generation of the reactive magnetic field is reduced, and the efficiency of the interaction between the current flowing through the coil 31 and the magnetic field can be improved.

Further, by applying the voltage between the pair of input electrodes 522, 523, the electric field E is generated on the piezoelectric resistor region 521. Then, the electric potential difference generated between the pair of output electrodes 524, 525 is detected in the electric field E thus generated, and the behavior such as the frequency, the amplitude, or a rotational angle of the movable plate 111 is detected based on the electric potential difference thus detected. Further, a control device not shown controls the alternating voltage to be applied to the coil 31 based on the behavior thus detected so as to obtain a desired behavior of the movable plate 111.

Configuration of Image Display Device

Figure 3:
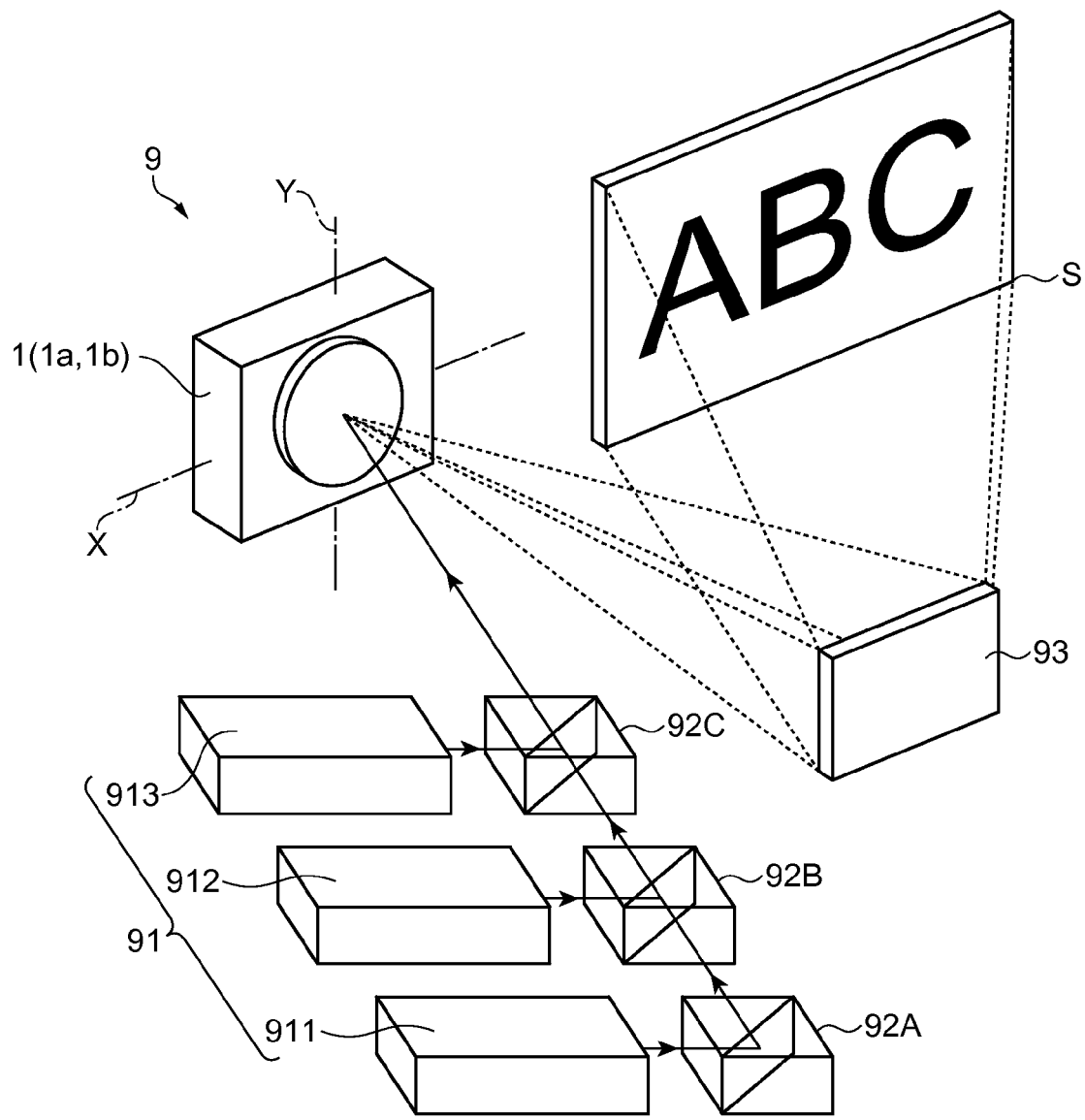
FIG. 3 is a schematic diagram showing a configuration of an image display device.

Then, a configuration of the image display device will be explained. The image display device is provided with an actuator having the movable plate, the first axial member for swingably supporting the movable plate around the first axis, the reflecting section fixed to the movable plate and having the reflecting surface for reflecting the light, and the coil disposed on the opposite surface of the reflecting section to the reflecting surface, and an irradiation section for irradiating the actuator with the light. FIG. 3 is a schematic diagram showing the configuration of the image display device. Hereinafter, the specific explanation will be presented. It should be noted that in the present embodiment, the case of using the light scanner 1 described above as an actuator will be explained.

As shown in FIG. 3, the image display device 9 is provided with the light scanner 1, the irradiation section 91 for irradiating the light scanner 1 with the light, and so on. The irradiation section 91 is provided with a red light source 911 for emitting red light, a blue light source 912 for emitting blue light, and a green light source 913 for emitting green light. Further, dichroic mirrors 92A, 92B, and 92C are disposed so as to correspond respectively to the red light source 911, the blue light source 912, and the green light source 913.

The dichroic mirrors 92A, 92B, and 92C are optical elements for combining the lights emitted respectively from the red light source 911, the blue light source 912, and the green light source 913. Such an image display device 9 as described above combines the lights emitted from the irradiation section 91 (the red light source 911, the blue light source 912, and the green light source 913) with the dichroic mirrors 92A, 92B, and 92C, respectively, based on the image information from a host computer not shown, and then the light scanner 1 is irradiated with the light thus combined. There is provided a configuration that two-dimensional scanning of the light scanner 1 is then performed to thereby form a color image on a screen S.

When performing the two-dimensional scanning, the light reflected by the reflecting section 113 is scanned (main scanned) in a lateral direction of the screen S due to the rotation of the movable plate 111 of the light scanner 1 around the Y axis. On the other hand, the light reflected by the reflecting section 113 is scanned (sub-scanned) in a vertical direction of the screen S due to the rotation of the movable plate 111 of the light scanner 1 around the X axis. It should be noted that although in the present embodiment, there is adopted the configuration in which the light combined by the dichroic mirrors 92A, 92B, and 92C is scanned two-dimensionally by the light scanner 1, then the light is reflected by the stationary mirror 93, and then the image is formed on the screen S, it is also possible to adopt the configuration in which the stationary mirror 93 is eliminated, and the screen S is irradiated directly with the light scanned two-dimensionally by the light scanner 1.

Figure 4:
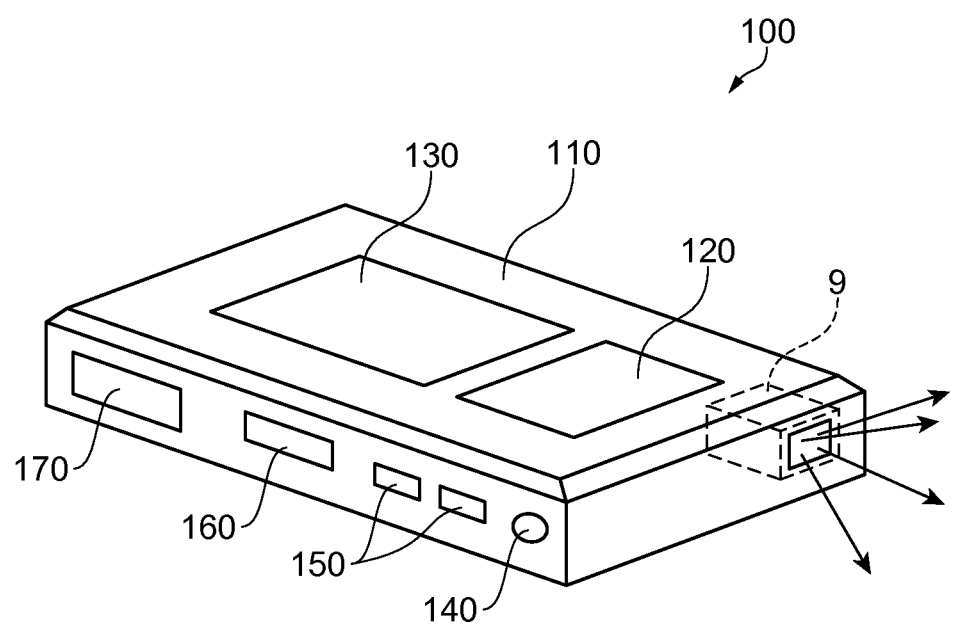
FIG. 4 is a schematic diagram showing a configuration of a portable image display device.

The image display device 9 described above can be applied as, for example, a portable image display device. FIG. 4 is a schematic diagram showing a configuration of the portable image display device. The portable image display device 100 has a casing 110 formed to have a size suitable to be gripped by a hand, and the image display device 9 incorporated in the casing 110. It is possible to display a predetermined image on a predetermined surface such as a screen or a surface of a desk using the portable image display device 100. Further, the portable image display device 100 has a display 120 for displaying predetermined information, a keypad 130, an audio port 140, control buttons 150, a card slot 160, and an AV port 170. It should be noted that the portable image display device 100 can be provided with other functions such as a telephone-call function or a GPS receiver function.

Configuration of Head-Up Display

Then, a configuration of a head-up display (HUD) will be explained. The head-up display (HUD) is provided with an actuator having the movable plate, the first axial member for swingably supporting the movable plate around the first axis, the reflecting section fixed to the movable plate and having the reflecting surface for reflecting the light, and the coil disposed on the opposite surface of the reflecting section to the reflecting surface, and an irradiation section for irradiating the actuator with the light. It should be noted that in the present embodiment, the case of using the light scanner 1 described above as an actuator will be explained.

Figure 5:
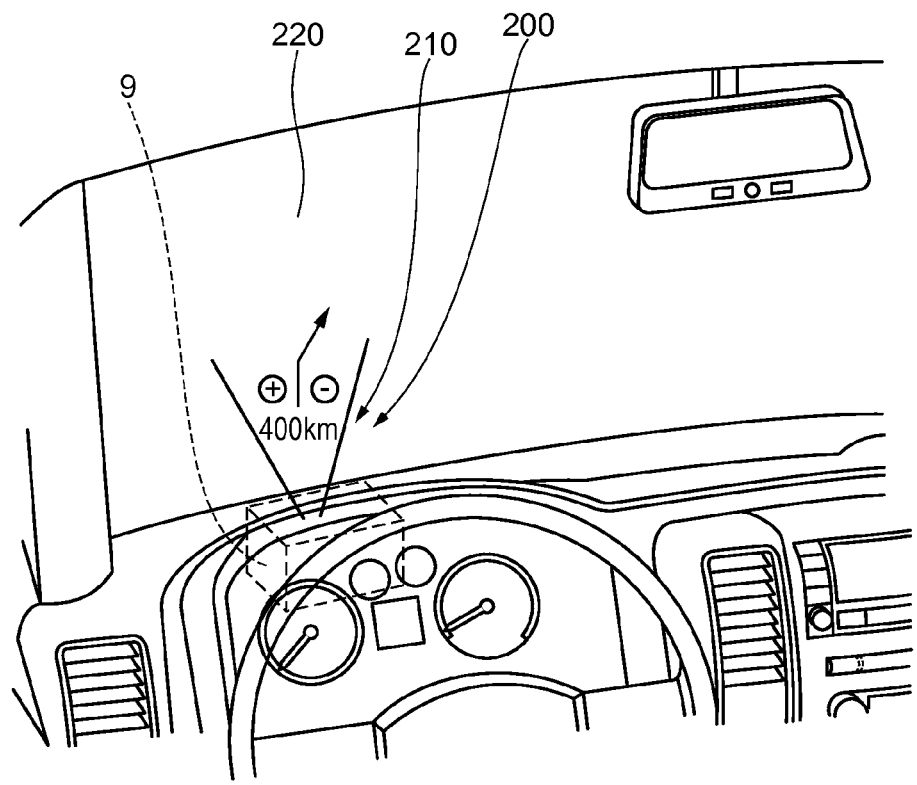
FIG. 5 is a schematic diagram showing a configuration of a head-up display.

FIG. 5 is a schematic diagram showing a configuration of the head-up display (HUD). As shown in FIG. 5, the head-up display (HUD) 210 is equipped with the image display device 9 provided with the light scanner 1 described above. Further, in a head-up display system 200, the image display device 9 is installed in, for example, a dashboard of a vehicle so as to constitute the head-up display 210. A predetermined image such as a guide display to the destination can be displayed on a front glass 220 using the head-up display 210. It should be noted that the head-up display system 200 can be applied to, for example, an aircraft and a ship besides a vehicle.

Configuration of Head Mount Display

Then, a configuration of a head mount display (HMD) will be explained. The head mount display is provided with an actuator having the movable plate, the first axial member for swingably supporting the movable plate around the first axis, the reflecting section fixed to the movable plate and having the reflecting surface for reflecting the light, and the coil disposed on the opposite surface of the reflecting section to the reflecting surface, and an irradiation section for irradiating the actuator with the light. It should be noted that in the present embodiment, the case of using the light scanner 1 described above as an actuator will be explained.

Figure 6:
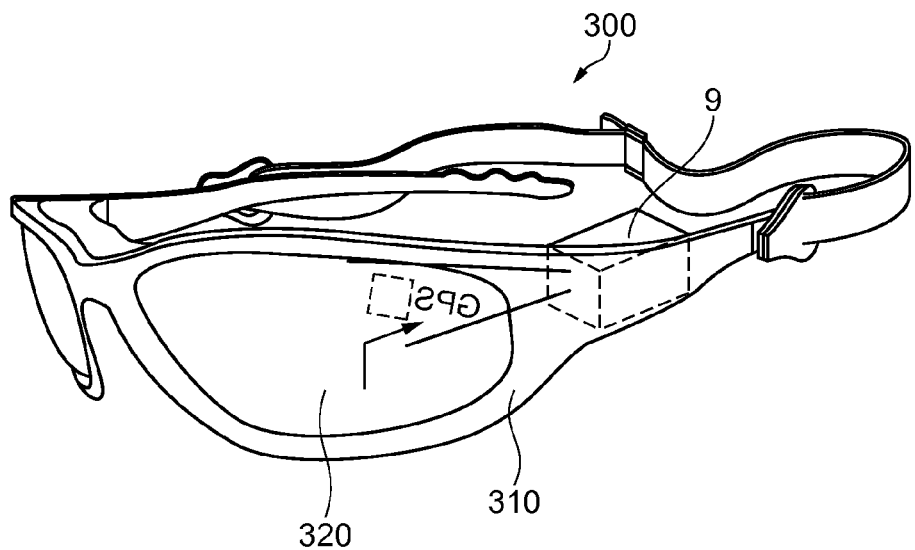
FIG. 6 is a schematic diagram showing a configuration of a head mount display.

FIG. 6 is a schematic diagram showing a configuration of the head mount display (HMD). As shown in FIG. 6, the head mount display (HMD) 300 is equipped with the image display device 9 provided with the light scanner 1 described above. The head mount display 300 is provided with a pair of glasses 310, and the image display device 9 is disposed on the pair of glasses 310. Further, the head mount display 300 displays a predetermined image to be visually recognized by one of the eyes on a display section 320 disposed at a region of the pair of glasses 310 where a lens is normally disposed.

The display section 320 can be transparent, or opaque. In the case in which the display section 320 is transparent, it is possible to use the information from the image display device 9 overlapping the information from the actual world. It should be noted that it is also possible to provide two image display devices 9 to the head mount display 300 to thereby arrange that the images to be visually recognized respectively by both of the eyes are displayed on the two display sections.

Although the configurations of the light scanner as the actuator, the image display device, and so on are explained hereinabove, the configurations are not limited to the above. For example, the configuration of each section can be replaced with an arbitrary configuration having substantially the same function, and further, it is also possible to add an arbitrary configuration. Further, the invention can be one obtained by combining any two or more configurations (features) out of the embodiment described above.

As described above, according to the first embodiment, the following advantage can be obtained.

1. Even in the case of reducing the space for the movable plate 111 to thereby miniaturize the overall structure including the outer frame support section 15, since the reflecting section 113 and the movable plate 111 are separated from each other, the size of the reflecting section 113 can be maintained without being affected by the size of the movable plate 111. Further, by forming the coil 31 on the second surface 113b of such a reflecting section 113, the number of turns (the formation area) of the coil can be ensured (prevented from decreasing). Thus, it is possible to increase the magnetic force to thereby improve the swing efficiency of the movable plate 111 and the reflecting section 113.

2. By forming the coil 31 on the second surface 113b of the reflecting section 113, the layout of the wiring line group 55 and the electrode group 56 in each of the detection sections 50a, 50b and the conduction wiring line 70a (70b) connected to the coil 31 and the external terminal 71a (71b) can easily be performed in the outer frame support section 15.

Second Embodiment

Configuration of Actuator (Light Scanner)

Figure 7:
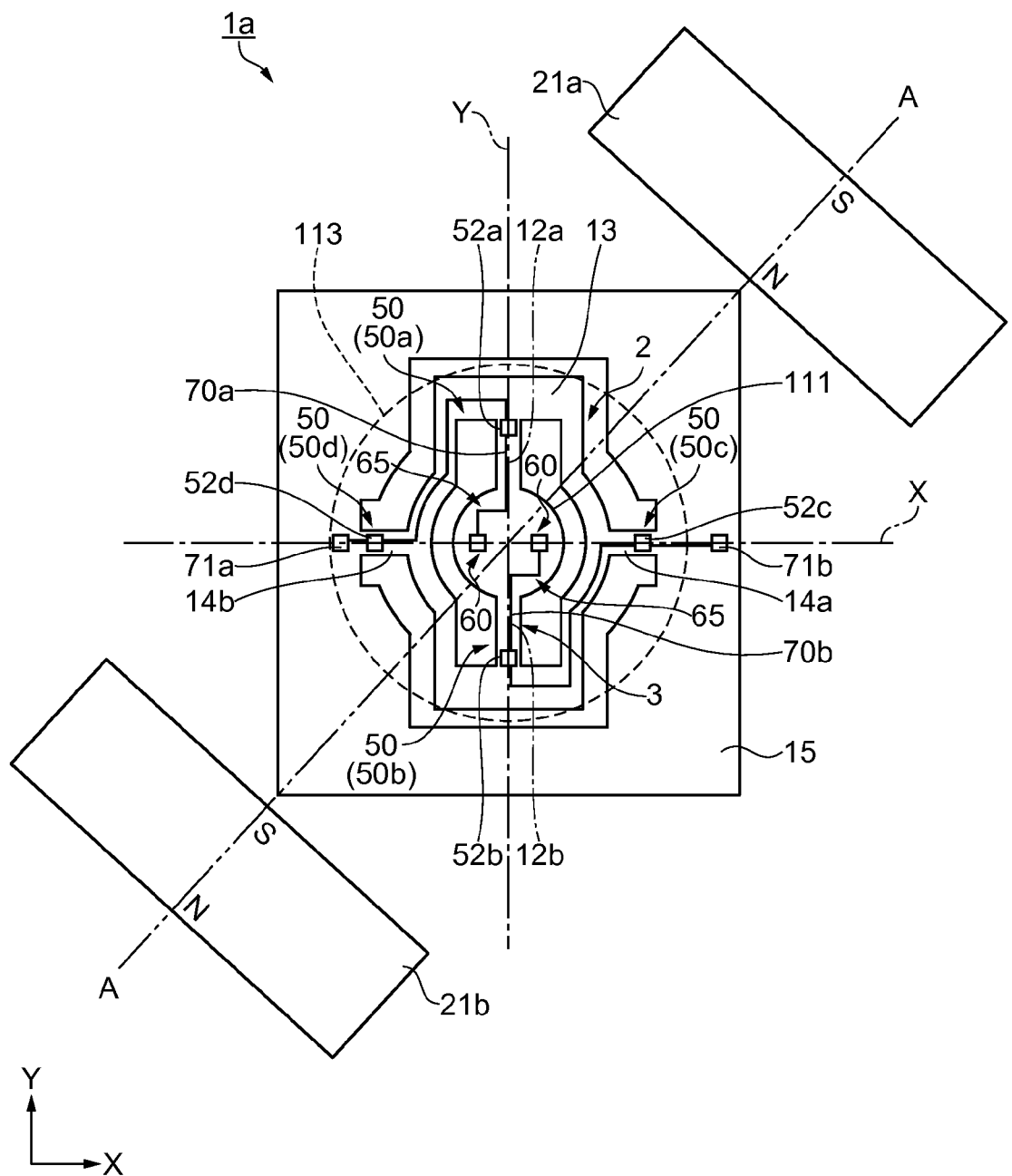
FIG. 7 is a plan view showing a configuration of a light scanner according to a second embodiment of the invention.
Figure 8:
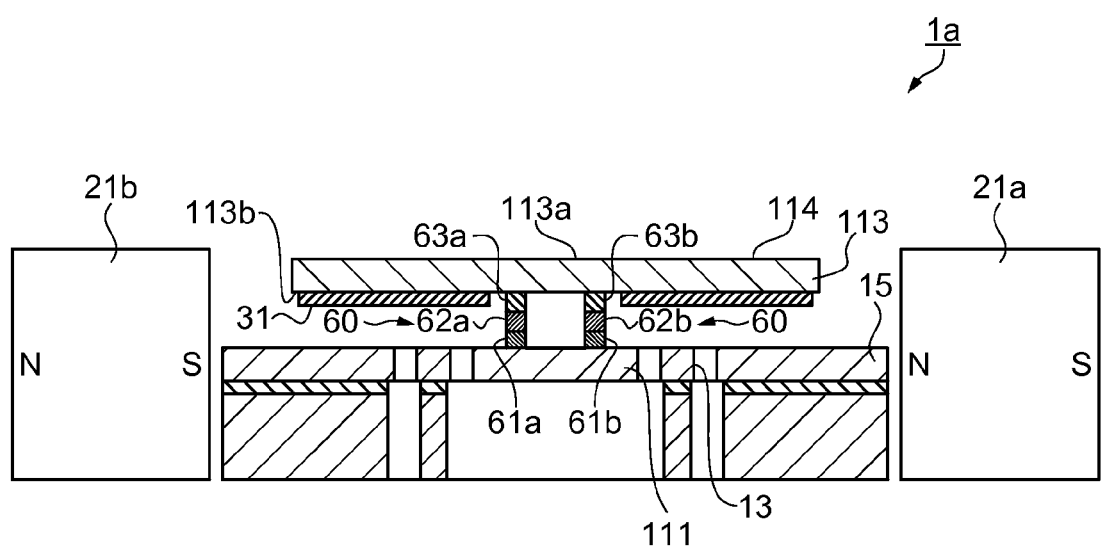
FIG. 8 is a cross-sectional view showing the configuration of the light scanner according to the second embodiment.

Then, a configuration of an actuator according to a second embodiment will be explained. It should be noted that in the present embodiment, the explanation will be presented citing a light scanner, as an actuator, as an example. FIG. 7 is a plan view showing a configuration of the light scanner according to the present embodiment, and FIG. 8 is a cross-sectional view showing the configuration of the light scanner according to the present embodiment. Further, FIG. 7 is a plan view viewed through the reflecting section, and FIG. 8 is a cross-sectional view along the A-A line in FIG. 7. It should be noted that the same components and so on as those in the first embodiment are denoted with the same reference symbols.

As shown in FIGS. 7 and 8, the light scanner 1a is provided with the movable plate 111, first axial members 12a, 12b for swingably supporting the movable plate 111 around the first axis (the Y axis), the reflecting section 113 fixed to the movable plate 111 and having the reflecting surface 114 for reflecting light, and the coil 31 disposed on the opposite surface of the reflecting section 113 to the reflecting surface 114, and is further provided with a movable frame 13 disposed on the periphery of the movable plate 111, to which the first axial members 12a, 12b are connected, and second axial members 14a, 14b connected to the movable frame 13, and for swingably supporting the movable frame 13 around a second axis (the X axis) intersecting with the first axis. Further, there are provided the pair of permanent magnets 21a, 21b disposed across the outer frame support section 15. Further, there is provided the voltage applying section 4 (see FIG. 9) for applying a predetermined voltage to the coil 31. Hereinafter, the specific explanation will be presented.

The movable plate 111 of the present embodiment has a circular shape in the plan view, and is disposed at a central portion of the light scanner 1a. The movable frame 13 has a frame-like shape, and is disposed so as to surround the periphery of the movable plate 111. In other words, the movable plate 111 is disposed inside the movable frame 13 having a frame-like shape. Further, the outer frame support section 15 has a frame-like shape, and is disposed so as to surround the periphery of the movable frame 13. In other words, the movable frame 13 is disposed inside the outer frame support section 15. The movable frame 13 is supported by the outer frame support section 15 via the second axial members 14a, 14b.

Further, the movable frame 13 is arranged to have a length in a direction along the Y axis longer than a length along the X axis. In other words, assuming that the length of the movable frame 13 in the direction along the Y axis is "a," and the length of the movable frame 13 in the direction along the X axis is "b," the relationship of a>b is fulfilled. Thus, it is possible to reduce the length of the light scanner 1 in the direction along the X axis while ensuring the necessary length for the first axial members 12a, 12b.

Further, the movable frame 13 forms a shape along the outer shape of the structure composed of the movable plate 111 and the first axial members 12a, 12b in the plan view. It should be noted that the shape of the movable frame 13 is not particularly limited providing the shape is the frame-like shape. In such a configuration as described above, miniaturization of the movable frame 13 can be achieved while allowing the oscillation of the oscillatory system composed of the movable plate 111, the first axial members 12a, 12b, and the permanent magnets 21a, 21b, namely the swing of the movable plate 111 around the Y axis.

The first axial members 12a, 12b and the second axial members 14a, 14b are each elastically deformable. Further, the first axial members 12a, 12b connect the movable plate 111 and the movable frame 13 to each other so that the movable plate 111 can rotate (swing) around the Y axis. Further, the second axial members 14a, 14b connect the movable frame 13 and the outer frame support section 15 to each other so that the movable frame 13 can rotate (swing) around the X axis perpendicular to the Y axis.

The first axial members 12a, 12b are disposed so as to be opposed to each other via the movable plate 111. Further, the first axial members 12a, 12b each have an elongated shape extending in a direction along the Y axis. Further, the first axial members 12a, 12b each have one end portion connected to the movable plate 111, and the other end portion connected to the movable frame 13. Further, the first axial members 12a, 12b are each disposed so that the center axis and the Y axis coincide with each other. The first axial members 12a, 12b configured in such a manner as described above are each torsionally deformed due to the swing of the movable plate 111 around the Y axis.

The second axial members 14a, 14b are disposed so as to be opposed to each other via the movable frame 13. Further, the second axial members 14a, 14b each have an elongated shape extending in a direction along the X axis. Further, the second axial members 14a, 14b each have one end portion connected to the movable frame 13, and the other end portion connected to the outer frame support section 15. The second axial members 14a, 14b configured in such a manner as described above are each torsionally deformed as a whole of the second axial member 14a, 14b due to the swing of the movable frame 13 around the X axis. By arranging that the movable plate 111 can swing around the Y axis, and at the same time, the movable frame 13 can swing around the X axis as described above, it is possible to swing (rotate) the reflecting section 113 around the two axes, namely the X axis and the Y axis.

It should be noted that the configurations of the first axial members 12a, 12b and the second axial members 14a, 14b are not limited to the configurations described above. For example, a meander shape having flexion or curvature at least one place in the middle can also be provided. Further, the number of the first axial members 12a, 12b and the second axial members 14a, 14b can be singular or plural. It should be noted that the movable plate 111, the movable frame 13, the first axial members 12a, 12b, the second axial members 14a, 14b, and the outer frame support section 15 are formed integrally using, for example, a silicon single crystal substrate.

The reflecting section 113 has a plate-like shape, and at the same time, has a circular shape in the plan view. Further, on the first surface 113a of the reflecting section 113, there is formed the reflecting surface 114 for reflecting light. Further, as shown in FIG. 8, on the second surface 113b of the reflecting section 113 opposite to the first surface 113a, there is formed the coil 31. It should be noted that the shape of the reflecting section 113 in the plan view is not limited to a circular shape, but can also be, for example, an elliptical shape or a polygonal shape such as a quadrangular shape.

Further, as shown in FIG. 7, the reflecting section 113 is formed so as to cover the movable frame 13 in the plan view. In the present embodiment, the movable plate 111, the first axial members 12a, 12b, the movable frame 13, and the second axial members 14a, 14b are disposed inside the reflecting section 113 in the plan view. Therefore, it is possible to increase the area of the reflecting section 113 while decreasing the distance between the first axial members 12a, 12b. Further, since it is possible to decrease the distance between the first axial members 12a, 12b, miniaturization of the movable frame 13 can be achieved. Further, since the miniaturization of the movable frame 13 can be achieved, it is possible to decrease the distance between the second axial members 14a, 14b. Thus, it becomes possible to miniaturize the overall structure of the light scanner 1 while keeping the area of the reflecting section 113 large. Further, it is possible to prevent unwanted light from being reflected by the movable plate 111, the first axial members 12a, 12b, the movable frame 13, and the second axial members 14a, 14b to become the stray light. Further, it is preferable that an antireflection treatment is performed on the surface of the outer frame support section 15. Thus, it is possible to prevent the unwanted light applied to the outer frame support section 15 from becoming the stray light. Such an antireflection treatment is not particularly limited, but there can be cited, for example, formation of an antireflection film (a dielectric multilayer film), a surface roughening process, and a blackening process. It should be noted that the antireflection treatment can also be performed on the surfaces of the movable plate 111, the first axial members 12a, 12b, the movable frame 13, and the second axial members 14a, 14b besides the outer frame support section 15.

As shown in FIG. 8, on the second surface 113b of the reflecting section 113, there is formed the coil 31. The coil 31 is formed by winding a wire around the center of the reflecting section 113 so as to form a ring-like shape (see FIG. 1C). Any material having electrical conductivity can be adopted as the material of the coil 31, and the metal such as copper or aluminum is preferable. Further, one end of the coil 31 is electrically connected to the first terminal 63a disposed on the second surface 113b of the reflecting section 113. Further, the other end of the coil 31 is electrically connected to the second terminal 63b disposed on the second surface 113b of the reflecting section 113.

Further, the movable plate 111 is provided with conduction connection sections 65, and there are provided the contact sections 60 disposed on the movable plate 111 and electrically connecting the coil 31 formed on the reflecting section 113 and the conduction connection sections 65 to each other. Specifically, the first connection terminal 61a and the second connection terminal 61b are formed on the movable plate 111 as a part of the conduction connection sections 65, and the conduction wiring lines 70a, 70b are extracted respectively from the first connection terminal 61a and the second connection terminal 61b. Further, the conduction wiring lines 70a, 70b are connected respectively to the external terminals 71a, 71b formed on the outer frame support section 15. Further, the external terminals 71a, 71b are electrically connected to the voltage applying section 4 (see FIG. 9).

The contact sections 60 are for electrically connecting the first terminal 63a and the second terminal 63b extracted from the coil 31 and the first connection terminal 61a and the second connection terminal 61b formed on the movable plate 111 to each other using the electrically-conductive members 62a, 62b, respectively. In the present embodiment, the first terminal 63a and the first connection terminal 61a, the second terminal 63b and the second connection terminal 61b are respectively connected to each other via, for example, a soldering material (soldering balls or soldering paste) as the electrically-conductive members 62a, 62b. It should be noted that a soft magnetic material having electrical conductivity such as nickel or permalloy (nickel-iron alloy) is preferably used for the first terminal 63a, the second terminal 63b, the first connection terminal 61a, and the second connection terminal 61b. By adopting such a configuration as described above, the first terminal 63a, the second terminal 63b, the first connection terminal 61a, and the second connection terminal 61b can be made to function as a core material.

Further, since the contact sections 60 are provided between the movable plate 111 and the reflecting section 113, there is provided a configuration in which the reflecting section 113 is separated in the thickness direction (the Z-axis direction) from the first axial members 12a, 12b. Therefore, since the reflecting section 113 is not directly connected to the side surfaces of the first axial members 12a, 12b, it is possible to prevent or inhibit the stress due to the torsional deformation of the first axial members 12a, 12b from acting on the reflecting section 113 when the reflecting section 113 swings (rotates), and as a result, the deflection of the reflecting section 113 can be reduced.

The pair of permanent magnets 21a, 21b are disposed so that the magnetic field is generated at an angle with the first axial members 12a, 12b and the second axial members 14a, 14b. Specifically, as shown in FIG. 7, the pair of permanent magnets 21a, 21b are disposed in a direction tilted with respect to the first axial members 12a, 12b and the second axial members 14a, 14b across the outer frame support section 15, namely across the coil 31 thus formed. In the case of the present embodiment, the pair of permanent magnets 21a, 21b are disposed so as to tilt with respect to the X axis and the Y axis. Further, it is also possible to rephrase that the pair of permanent magnets 21a, 21b are disposed on an axis tilted with respect to the X axis and the Y axis. It should be noted that in the present embodiment, the pair of permanent magnets 21a, 21b are disposed across a pair of opposing corners of the outer frame support section 15. By disposing the pair of permanent magnets 21a, 21b in such a manner, it is possible to generate the magnetic field at an angle with the first axis and the second axis.

The permanent magnets 21a, 21b each have one side magnetized to the north pole in the direction toward the central portion of the outer frame support section 15, and the other side magnetized to the south pole, and are arranged so that the opposite magnetic poles are opposed to each other in the pair of permanent magnets 21a, 21b. In the present embodiment, the permanent magnets 21a, 21b are disposed so that the north pole of one permanent magnet 21a and the south pole of the other permanent magnet 21b are opposed to each other.

The tilt angle of the permanent magnets 21a, 21b thus disposed with respect to the X axis (or the Y axis) is preferably in a range of 30 through 60 degrees, more preferably in a range of 40 through 50 degrees, and further more preferably at roughly 45 degrees. By arranging the permanent magnets 21a, 21b in such a manner, it is possible to smoothly swing (rotate) the movable plate 111.

As each of the permanent magnets 21a, 21b described above, a neodymium magnet, a ferrite magnet, a samarium-cobalt magnet, an alnico magnet, a bond magnet, or the like can preferably be used.

Further, the first axial members 12a, 12b are provided with first detection sections 50a, 50b for detecting the behavior of the first axial members 12a, 12b, and the second axial members 14a, 14b are provided with second detection sections 50c, 50d for detecting the behavior of the second axial members 14a, 14b, respectively. The detection sections 50 (50a, 50b, 50c, and 50d) of the present embodiment include piezoelectric resistor elements 52a, 52b, 52c, and 52d. As shown in FIG. 7, the piezoelectric resistor element 52a is disposed on the upper surface of the first axial member 12a, the piezoelectric resistor element 52b is disposed on the upper surface of the first axial member 12b, the piezoelectric resistor element 52c is disposed on the upper surface of the second axial member 14a, and the piezoelectric resistor element 52d is disposed on the upper surface of the second axial member 14b. More specifically, the piezoelectric resistor elements 52a, 52b are disposed at end portions of the first axial members 12a, 12b on the side near to the movable frame 13 (far from the movable plate 111), and the piezoelectric resistor elements 52c, 52d are disposed at end portions of the second axial members 14a, 14b on the side near to the outer frame support section 15 (far from the movable frame 13). It should be noted that the configurations of the detection sections 50a, 50b, 50c, and 50d are substantially the same as those of the first embodiment, and therefore, the explanation thereof will be omitted (see FIG. 2).

Figure 9:
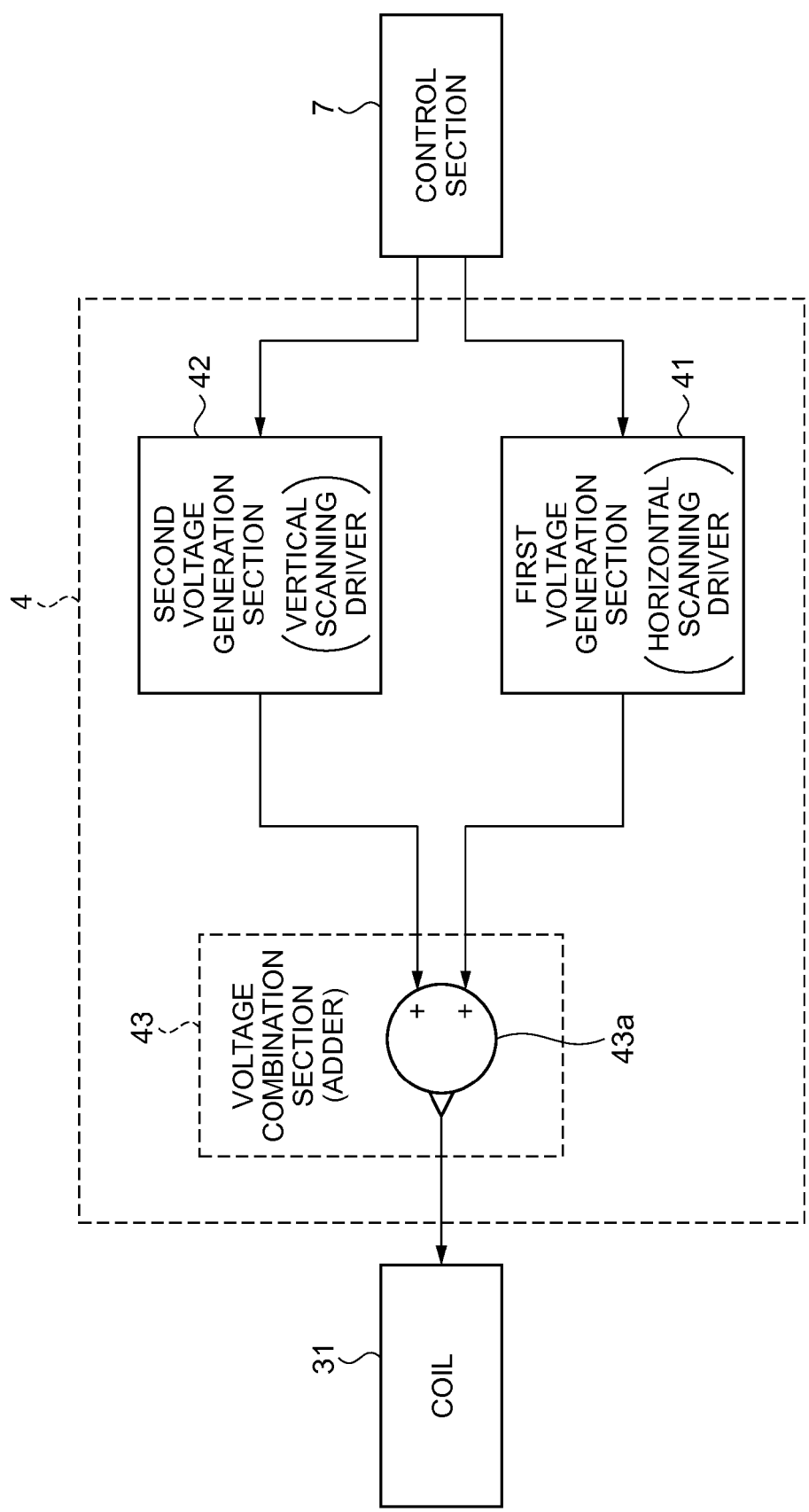
FIG. 9 is a block diagram showing a configuration of a voltage applying section.

Then, a configuration of the voltage applying section will be explained. FIG. 9 is a block diagram showing a configuration of the voltage applying section, and FIGS. 10A and 10B are explanatory diagrams showing an example of generated voltages.

As shown in FIG. 9, the voltage applying section 4 is provided with a first voltage generation section 41 for generating a first voltage V1 for swinging the movable plate 111 around the Y axis, a second voltage generation section 42 for generating a second voltage V2 for swinging the movable plate 111 around the X axis, and a voltage combination section 43 for combining the first voltage V1 and the second voltage V2 with each other. The first voltage generation section 41 and the second voltage generation section 42 of the voltage applying section 4 are each connected to a control section 7. Further, the voltage applying section 4 is electrically connected to the first terminal 32a and the second terminal 32b of the coil 31, and is configured so as to apply the voltage combined by the voltage combination section 43 to the coil 31.

Figure 10A:
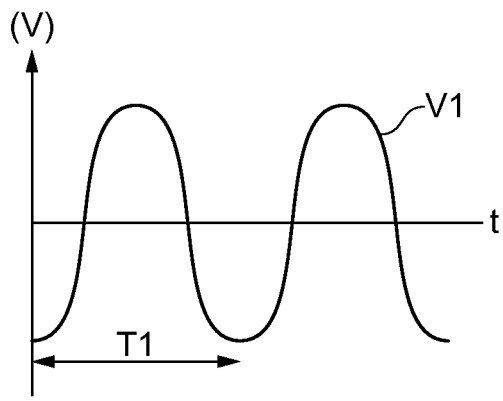
FIGS. 10A and 10B are explanatory diagrams showing an example of generated voltages.
Figure 10B:
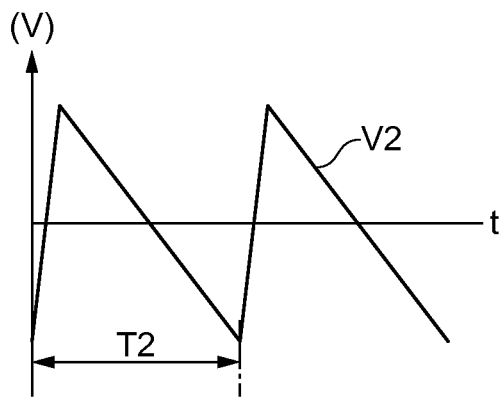

As shown in FIG. 10A, the first voltage generation section 41 is for generating the first voltage V1 (a horizontal scanning voltage) periodically varying with a period T1. In other words, the first voltage generation section 41 is for generating the first voltage V1 with a first frequency (1/T1). The first voltage V1 has a sinusoidal waveform. Therefore, the light scanner 1 can efficiently perform the main scanning of the light. It should be noted that the waveform of the first voltage V1 is not limited to the above.

Further, the first frequency (1/T1) is not particularly limited providing the frequency is suitable for the horizontal scanning, but is preferably in a range of 10 through 40 kHz. In the present embodiment, the first frequency is set to be equal to a torsional resonance frequency (f1) of a first oscillatory system (a torsional oscillatory system) constituted by the movable plate 111 and the first axial members 12a, 12b. In other words, the first oscillatory system is designed (manufactured) so that the torsional resonance frequency f1 becomes a frequency suitable for the horizontal scanning. Thus, it is possible to enlarge the rotational angle of the movable plate 111 around the Y axis.

Incidentally, as shown in FIG. 10B, the second voltage generation section 42 is for generating the second voltage V2 (a vertical scanning voltage) periodically varying with a period T2 different from the period T1. In other words, the second voltage generation section 42 is for generating the second voltage V2 with a second frequency (1/T2). The second voltage V2 has a saw-tooth waveform. Therefore, the light scanner 1 can efficiently perform the vertical scanning (sub-scanning) of the light. It should be noted that the waveform of the second voltage V2 is not limited to the above.

The second frequency (1/T2) is not particularly limited providing the frequency is different from the first frequency (1/T1), and is suitable for the vertical scanning, but is preferably in a range of 30 through 120 Hz. Further, roughly 60 Hz is more preferable. By setting the frequency of the second voltage V2 to roughly 60 Hz and setting the frequency of the first voltage V1 in a range of 10 through 40 kHz as described above, it is possible to rotate the movable plate 111 around each of the two axes (the X axis and the Y axis) perpendicular to each other at frequencies suitable for the drawing in the display. However, if the movable plate 111 can be rotated around each of the X axis and the Y axis, the combination of the frequency of the first voltage V1 and the frequency of the second voltage V2 is not particularly limited.

In the present embodiment, the frequency of the second voltage V2 is adjusted to be a frequency different from the torsional resonance frequency (the resonance frequency) of a second oscillatory system (a torsional oscillatory system) constituted by the movable plate 111, the first axial members 12a, 12b, the movable frame 13, and the second axial members 14a, 14b. It is preferable that the frequency (the second frequency) of such a second voltage V2 is lower than the frequency (the first frequency) of the first voltage V1. In other words, it is preferable that the period T2 is longer than the period T1. Thus, it is possible to more surely and more smoothly rotate the movable plate 111 around the X axis at the second frequency while rotating the movable plate 111 around the Y axis at the first frequency.

Further, assuming that the torsional resonance frequency of the first oscillatory system is f1 [Hz], and the torsional resonance frequency of the second oscillatory system is f2 [Hz], f1 and f2 preferably fulfill the relationship of f2<f1, and more preferably fulfill the relationship of f1≥10f2 Thus, it is possible to more smoothly rotate the movable plate 111 around the X axis at the frequency of the second voltage V2 while rotating the movable plate 111 around the Y axis at the frequency of the first voltage V1.

Such a first voltage generation section 41 and such a second voltage generation section 42 are driven based on the signals from the control section 7 connected to the respective voltage generation sections. Further, the first voltage generation section 41 and the second voltage generation section 42 are each connected to the voltage combination section 43. The voltage combination section 43 is provided with an adder 43a for applying the voltage to the coil 31. The adder 43a receives the first voltage V1 from the first voltage generation section 41, and at the same time, receives the second voltage V2 from the second voltage generation section 42, then combines these voltages, and then applies the result to the coil 31.

Then, an operation of the light scanner 1 will be explained. It should be noted that as described above, in the present embodiment, the frequency of the first voltage V1 is set to be equal to the torsional resonance frequency of the first oscillatory system, and the frequency of the second voltage V2 is set to a value, which is different from the torsional resonance frequency of the second oscillatory system, and is lower than the frequency of the first voltage V1 (e.g., the frequency of the first voltage V1 is set to 15 kHz, and the frequency of the second voltage V2 is set to 60 Hz).

Firstly, for example, the first voltage V1 shown in FIG. 10A and the second voltage V2 shown in FIG. 10B are combined in the voltage combination section 43, and then, the voltage thus combined is applied to the coil 31. Then, the current flows through the coil 31 due to the first voltage V1 applied to the coil 31. As a result, due to the Lorentz force caused by the interaction between the current flowing through the coil 31 and the magnetic field between the pair of permanent magnets 21a, 21b, the movable plate 111 swings taking the Y axis (the first axis) as the center axis with the first axial members 12a, 12b torsionally deformed. Further, the frequency of the first voltage V1 is equal to the torsional resonance frequency of the first oscillatory system. Therefore, the movable plate 111 can be rotated around the Y axis due to the first voltage V1. Therefore, even in the case in which the oscillation having the torsional oscillation component of the movable frame 13 around the Y axis described above is small, the rotational angle of the movable plate 111 around the Y axis due to the oscillation can be increased.

Further, the current flows through the coil 31 due to the second voltage V2 applied to the coil 31. As a result, due to the Lorentz force caused by the interaction between the current flowing through the coil 31 and the magnetic field between the pair of permanent magnets 21a, 21b, the movable frame 13 swings taking the X axis (the second axis) as the center axis together with the movable plate 111 while torsionally deforming the second axial members 14a, 14b. Further, the frequency of the second voltage V2 is set to be extremely low compared to the frequency of the first voltage V1. Further, the torsional resonance frequency of the second oscillatory system is designed to be lower than the torsional resonance frequency of the first oscillatory system. Therefore, the movable plate 111 can be prevented from rotating around the Y axis at the frequency of the second voltage V2.

Further, the first terminal 63a, the second terminal 63b, the first connection terminal 61a, and the second connection terminal 61b constituting a part of the contact sections 60 are each made of a soft magnetic material, and therefore function as the core material. Specifically, the magnetic field generated in the permanent magnet 21a traverses the coil 31 and proceeds toward the permanent magnet 21b on the one hand, there can be the case in which the magnetic field generated in the permanent magnet 21a fails to traverse the coil 31 and proceeds toward the permanent magnet 21b via the outside (the periphery) of the coil 31 on the other hand. In this case, the magnetic field (reactive magnetic field) passing through the outside of the coil 31 fails to make a contribution to the interaction with the current flowing through the coil 31, and is therefore one of the factors of the degradation of the swing efficiency of the movable plate 111 and so on. Therefore, in the present embodiment, the contact sections 60 having a function of the core material are disposed in the central portion of the coil 31 formed to have a ring-like shape in the plan view. Therefore, since the magnetic field generated in the permanent magnet 21a proceeds toward the permanent magnet 21b while proceeding toward the core material (the contact sections 60), it is possible to concentrate the magnetic field so as to traverse the coil 31. Thus, the generation of the reactive magnetic field is reduced, and the efficiency of the interaction between the current flowing through the coil 31 and the magnetic field can be improved.

It should be noted that the configuration of the image display device equipped with the light scanner 1a according to the present embodiment is substantially the same as in the first embodiment, and therefore, the explanation thereof will be omitted. Further, the configurations of the head-up display (HUD) and the head mount display (HMD) are also substantially the same as those of the first embodiment, and therefore, the explanation thereof will be omitted.

As described hereinabove, according to the second embodiment described above, the following advantages can be obtained in addition to the advantages of the first embodiment.

1. The light scanner 1a is configured including the movable plate 111 and the movable frame 13, and the reflecting section 113 fixed to the movable plate 111 is made swingable around the first axial members 12a, 12b, and the second axial members 14a, 14b. Further, it is possible to reliably ensure the place for forming the coil 31 on the surface of the reflecting section 113 without being restricted by the size of the movable frame 13.

2. By forming the coil 31 on the second surface 113b of the reflecting section 113, the layout of the wiring line group 55 and the electrode group 56 in each of the detection sections 50a, 50b and the conduction wiring line 70a (70b) connected to the coil 31 and the external terminal 71a (71b) can easily be performed in the movable frame 13.

Third Embodiment

Configuration of Actuator (Light Scanner)

Figure 11:
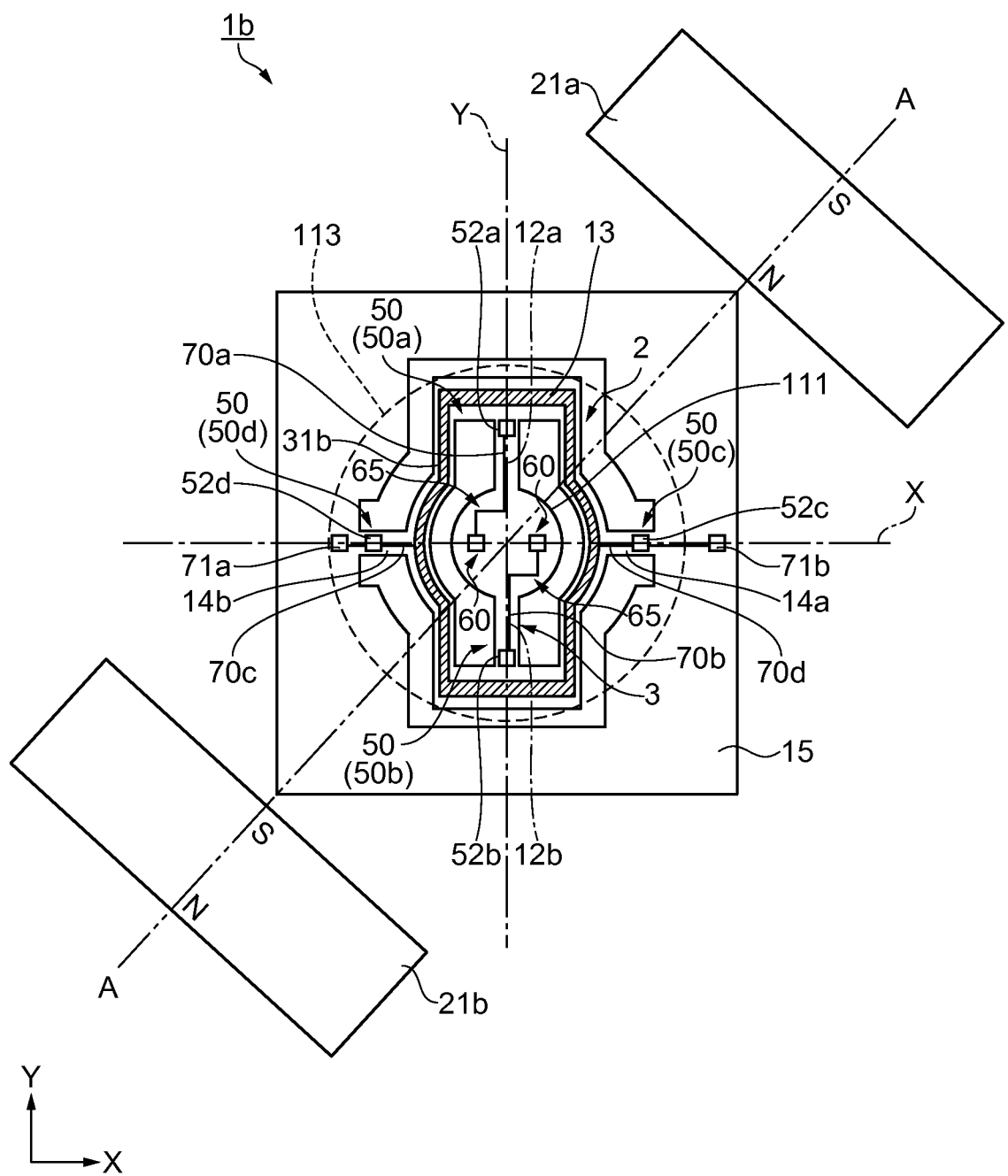
FIG. 11 is a plan view showing a configuration of a light scanner according to a third embodiment of the invention.
Figure 12:
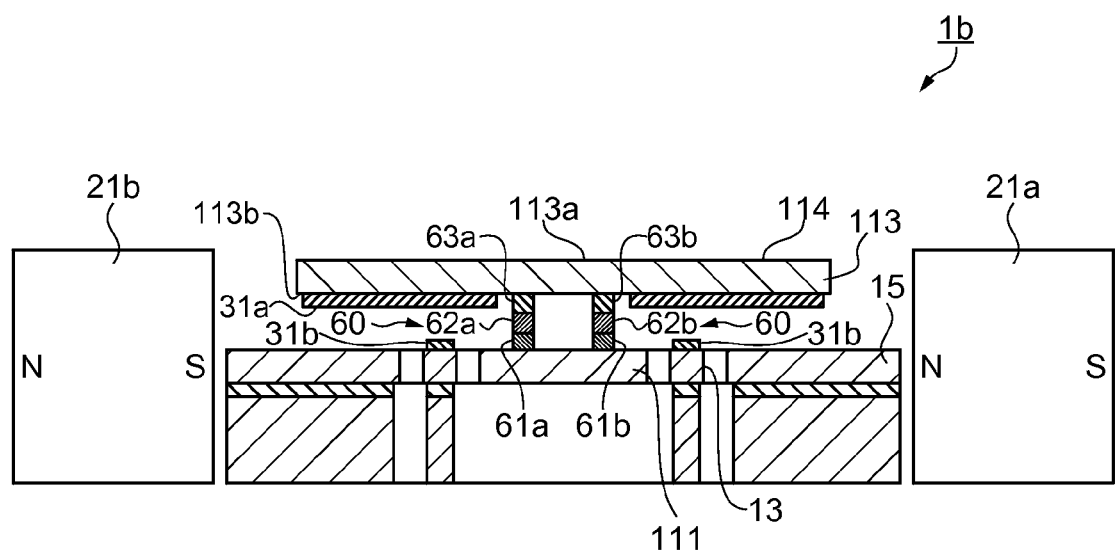
FIG. 12 is a cross-sectional view showing the configuration of the light scanner according to the third embodiment.

Then, a configuration of an actuator according to a third embodiment will be explained. It should be noted that in the present embodiment, the explanation will be presented citing a light scanner, as an actuator, as an example. FIG. 11 is a plan view showing a configuration of the light scanner according to the present embodiment, and FIG. 12 is a cross-sectional view showing the configuration of the light scanner according to the present embodiment. Further, FIG. 11 is a plan view viewed through the reflecting section, and FIG. 12 is a cross-sectional view along the A-A line in FIG. 11. It should be noted that the same components and so on as those in the second embodiment are denoted with the same reference symbols. Further, portions with configurations different from those of the second embodiment will mainly be explained.

As shown in FIGS. 11 and 12, the light scanner 1b is provided with the movable plate 111, the first axial members 12a, 12b for swingably supporting the movable plate 111 around the first axis, the reflecting section 113 fixed to the movable plate 111 and having the reflecting surface 114 for reflecting light, and the coil 31a disposed on the opposite surface of the reflecting section 113 to the reflecting surface 114, and is further provided with the movable frame 13 disposed on the periphery of the movable plate 111, to which the first axial members 12a, 12b are connected, and the second axial members 14a, 14b connected to the movable frame 13, and for swingably supporting the movable frame 13 around the second axis (the X axis) intersecting with the first axis. Further, the movable frame 13 is further provided with a coil 31b. Further, there are provided the pair of permanent magnets 21a, 21b disposed across the outer frame support section 15. Further, there is provided the voltage applying section 4 (see FIG. 9) for applying predetermined voltages to the coils 31a, 31b.

The light scanner 1b according to the present embodiment has the coil 31a and the coil 31b. Specifically, as shown in FIGS. 11 and 12, on the second surface 113b of the reflecting section 113, there is formed the coil 31a. The coil 31a is formed by winding a wire around the center of the reflecting section 113 so as to form a ring-like shape (see FIG. 1C). Any material having electrical conductivity can be adopted as the material of the coil 31a, and the metal such as copper or aluminum is preferable. Further, one end of the coil 31a is electrically connected to the first terminal 63a disposed on the second surface 113b of the reflecting section 113. Further, the other end of the coil 31a is electrically connected to the second terminal 63b disposed on the second surface 113b of the reflecting section 113.

Further, the first connection terminal 61a and the second connection terminal 61b are formed on the movable plate 111, and the conduction wiring lines 70a, 70b are extracted respectively from the first connection terminal 61a and the second connection terminal 61b.

The contact sections 60 are for electrically connecting the first terminal 63a and the second terminal 63b extracted from the coil 31a and the first connection terminal 61a and the second connection terminal 61b formed on the movable plate 111 to each other using the electrically-conductive members 62a, 62b, respectively. In the present embodiment, the first terminal 63a and the first connection terminal 61a, the second terminal 63b and the second connection terminal 61b are respectively connected to each other via, for example, a soldering material (soldering balls or soldering paste) as the electrically-conductive members 62a, 62b. It should be noted that a soft magnetic material having electrical conductivity such as nickel or permalloy (nickel-iron alloy) is preferably used for the first terminal 63a, the second terminal 63b, the first connection terminal 61a, and the second connection terminal 61b. By adopting such a configuration as described above, the first terminal 63a, the second terminal 63b, the first connection terminal 61a, and the second connection terminal 61b can be made to function as a core material.

Further, the movable frame 13 is provided with the coil 31b. The coil 31b is formed by winding a wire following the shape of the movable frame 13 so as to form a ring-like shape. The material of the coil 31b is as the material of the coil 31a. Further, in detail, one end of the coil 31a provided to the reflecting section 113 is connected to the conduction wiring line 70a via the contact section 60, and the conduction wiring line 70a and one proximal end of the coil 31b provided to the movable frame 13 are connected to each other. Further, the other end of the coil 31a is connected to the conduction wiring line 70b via the contact section 60, and the conduction wiring line 70b and the other proximal end of the coil 31b are connected to each other.

Further, one distal end of the coil 31b is connected to the conduction wiring line 70c, and the conduction wiring line 70c is connected to the external terminal 71a formed on the outer frame support section 15. Further, the other distal end of the coil 31b is connected to the conduction wiring line 70d, and the conduction wiring line 70d is connected to the external terminal 71b formed on the outer frame support section 15. Further, the external terminals 71a, 71b are electrically connected to the voltage applying section 4 (see FIG. 9).

It should be noted that the rest of the configuration of the light scanner 1b is substantially the same as in the second embodiment, and therefore, the explanation thereof will be omitted. Further, the configuration of the image display device equipped with the light scanner 1b according to the present embodiment is also substantially the same as in the first embodiment, and therefore, the explanation thereof will be omitted. Further, the configurations of the head-up display (HUD) and the head mount display (HMD) are also substantially the same as those of the first embodiment, and therefore, the explanation thereof will be omitted.

As described hereinabove, according to the third embodiment described above, the following advantage can be obtained in addition to the advantages of the first and second embodiments.

Since the coil 31b is further provided also to the movable frame 13 in addition to the coil 31a formed on the second surface 113b of the reflecting section 113, it is possible to further increase the magnetic force to thereby improve the drive efficiency of the reflecting section 113.

It should be noted that the invention is not limited to the embodiments described above, but various modifications or improvements can be provided to the embodiments described above. Some modified examples will be described below.

First Modified Example

It is also possible to dispose the core material on the surface of the movable plate 111 of the embodiments described above, the surface being opposite to the surface on which the contact sections 60 are formed. By adopting such a configuration, since the magnetic field due to the permanent magnets 21a, 21b is further concentrated in the direction in which the core material is disposed, the drive efficiency of the reflecting section 113 can further be improved.

Second Modified Example

Although in the embodiments described above, the contact sections 60 are formed to have the function of the pillars, the contact sections are not limited to this configuration. For example, it is also possible to dispose a pillar between the movable plate 111 and the reflecting section 113, and form the contact sections 60 along the pillar. Further, a configuration having the contact sections 60 inside the pillar can also be adopted. According to such a configuration, the bonding strength between the movable plate 111 and the reflecting section 113 can be increased. Further, it is also possible to cover the contact sections 60 in each of the embodiments described above with insulating resin or the like. According to such a configuration, the bonding strength between the movable plate 111 and the reflecting section 113 can be increased, and at the same time, the waterproof property in the contact sections 60 can be improved.

The entire disclosure of Japanese Patent Application No. 2012-201300, filed Sep. 13, 2012 is expressly incorporated by reference herein.

What is claimed is:

1. A light scanner comprising:
a movable plate;
a first axial member adapted to swingably support the movable plate around a first axis;
a reflecting section fixed to the movable plate, and having a reflecting surface adapted to reflect light; and
a coil disposed on an opposite surface of the reflecting section to the reflecting surface and the opposite surface opposed to a surface of the movable plate which the reflecting section is fixed, such that the coil is disposed between the reflecting section and the movable plate.

2. The light scanner according to claim 1, wherein an area of the reflecting section is larger than an area of the movable plate in a plan view from a thickness direction of the movable plate.

3. The light scanner according to claim 1, further comprising:
 a conduction connection section provided to the movable plate; and
 a contact section disposed on the conduction connection section, and adapted to electrically connect the coil and the conduction connection section to each other.

4. The light scanner according to claim 1, further comprising:
 a first detection section provided to the first axial member and adapted to detect a stress generated in the first axial member.

5. The light scanner according to claim 1, further comprising:
 a movable frame disposed on a periphery of the movable plate, and to which the first axial member is connected; and
 a second axial member connected to the movable frame, and adapted to swingably support the movable frame around a second axis intersecting with the first axis.

6. The light scanner according to claim 5, further comprising:
 a coil provided to the movable frame.

7. The light scanner according to claim 5, wherein the reflecting section is disposed so as to cover the movable frame in the plan view.

8. The light scanner according to claim 5, further comprising:
 a second detection section provided to the second axial member and adapted to detect a stress generated in the second axial member.

9. An image display device comprising:
 an actuator including
  a movable plate,
  a first axial member adapted to swingably support the movable plate around a first axis,
  a reflecting section fixed to the movable plate, and having a reflecting surface adapted to reflect light, and
  a coil disposed on an opposite surface of the reflecting section to the reflecting surface and the opposite surface opposed to a surface of the movable plate which the reflecting section is fixed, such that the coil is disposed between the reflecting section and the movable plate; and
 an irradiation section adapted to irradiate the actuator with the light.

10. A head mount display comprising:
 an actuator including
  a movable plate,
  a first axial member adapted to swingably support the movable plate around a first axis,
  a reflecting section fixed to the movable plate, and having a reflecting surface adapted to reflect light, and
  a coil disposed on an opposite surface of the reflecting section to the reflecting surface and the opposite surface opposed to a surface of the movable plate which the reflecting section is fixed, such that the coil is disposed between the reflecting section and the movable plate; and
 an irradiation section adapted to irradiate the actuator with the light.

* * * * *